United States Patent
Genovese

[19]

[11] Patent Number: 5,950,502
[45] Date of Patent: Sep. 14, 1999

[54] ORTHOGONAL DIFFERENTIAL DRIVE

[76] Inventor: Vincent Genovese, 15 Indian Trail, Sparta, N.J. 07871

[21] Appl. No.: 09/039,432

[22] Filed: Mar. 16, 1998

[51] Int. Cl.$^6$ .............................. F16H 1/14; F16H 33/00; F16H 37/06

[52] U.S. Cl. ........................... 74/640; 74/665 M; 74/417

[58] Field of Search ........................ 74/416, 417, 665 L, 74/665 M, 665 N, 461, 640

[56] References Cited

U.S. PATENT DOCUMENTS

| | | | |
|---|---|---|---|
| 4,761,114 | 8/1988 | Barland | 74/665 M X |
| 5,050,450 | 9/1991 | Nakamura | 74/640 X |

Primary Examiner—Lenard A. Footland
Assistant Examiner—Colby Hansen
Attorney, Agent, or Firm—Thomas L. Adams

[57] ABSTRACT

An orthogonal differential drive has a main shaft with a main axis. Also included is a primary gear, coaxially mounted on the main shaft, and a secondary gear. The differential drive also has a harmonic drive with a main throughput, a trim throughput, and a harmonic throughput. The harmonic throughput has a speed that is established as a linear combination of speeds of the main throughput and the trim throughput. The secondary gear is coaxially coupled to the main throughput of the harmonic drive. The secondary gear has an axis of rotation positioned transversely to that of the primary gear for engaging the primary gear. Also included is a transfer device spaced from the main axis of the main shaft for interactively engaging the trim throughput of the harmonic drive.

23 Claims, 4 Drawing Sheets

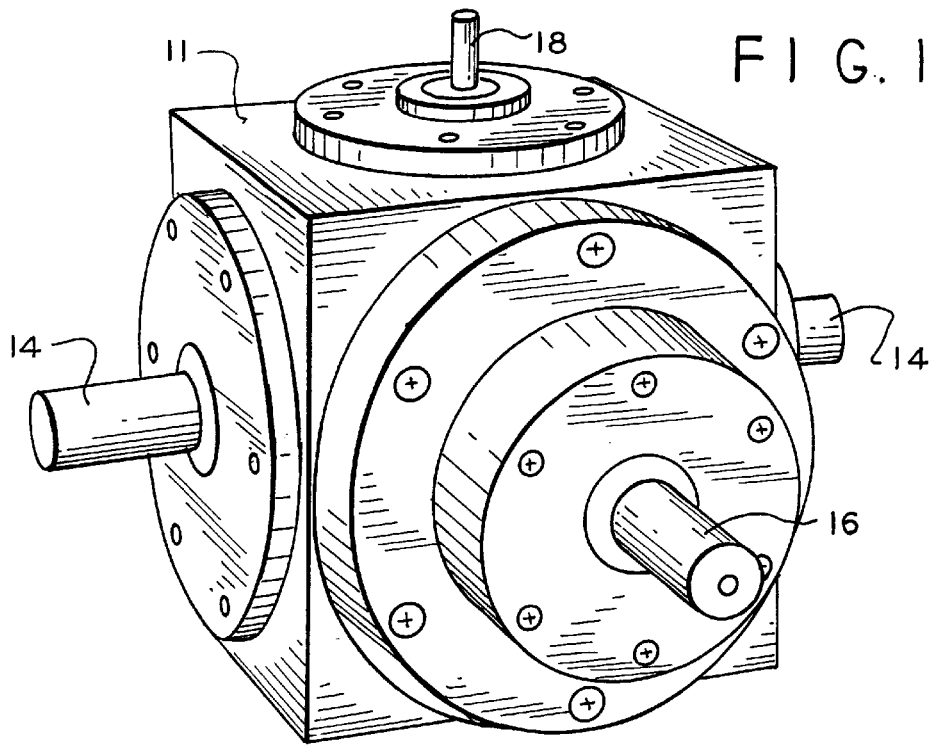
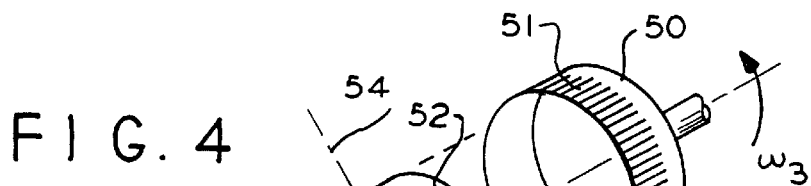
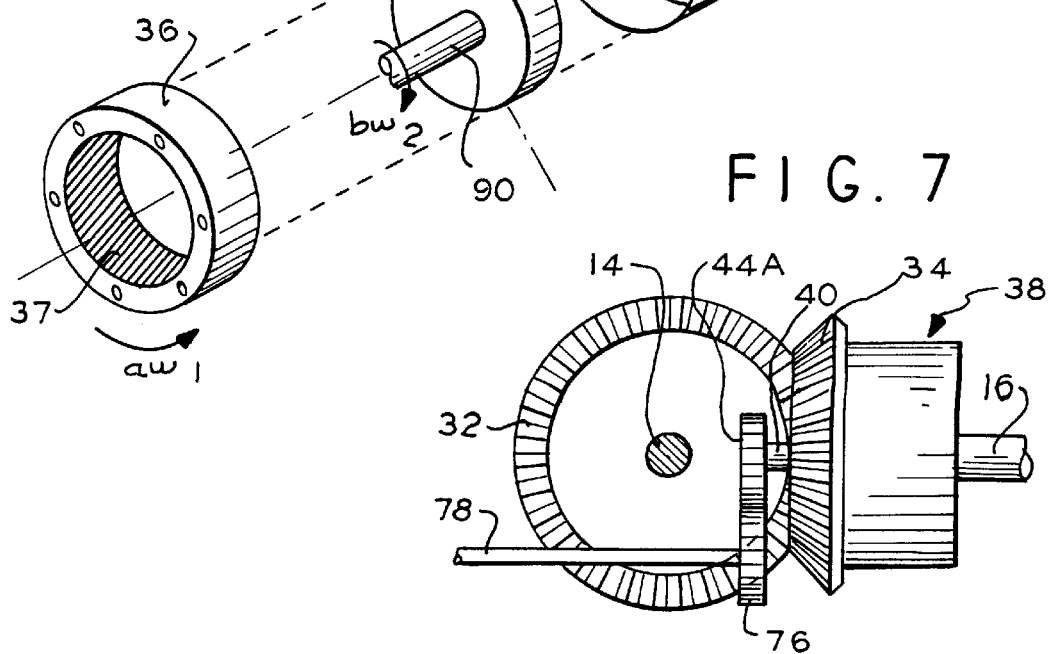

ORTHOGONAL DIFFERENTIAL DRIVE

BACKGROUND OF THE INVENTION

1. Field of the Invention

The present invention relates to orthogonal drives, and in particular, to drives employing a mechanism to produce a speed difference.

2. Description of Related Art

In various industries, it is desirable to derive power from a main shaft and distribute that rotating power at right angles to the main shaft. Power is commonly distributed in that fashion in the printing industries, where a number of web handling stations are arranged in a line to perform such tasks as printing, die cutting, folding, stacking etc. In these situations the various web handling stations must remain synchronous to keep registration on the web.

Keeping registration between stations will often require adjustments to the speed of individual web handling stations. Some stations may need to run slightly faster to account for stretching of the web. Also, temporary speed adjustments may be necessary to bring the stations back into registration after being perturbed.

Known orthogonal drives employ a gear box containing of pair of bevel gears. A main shaft that protrudes through opposite sides of the gear box drives a first bevel gear. A second bevel gear is driven by the first to deliver an output at right angles to the main shaft. (As used herein, the term "bevel gear" is defined to include both straight bevel gears and spiral bevel gears.)

Adjustments to the output speed of a main drive shaft can be achieved with a class of mechanisms known as differential drives. One known differential drive is the planetary gear. Another known differential drive is the harmonic drive. The harmonic drive has a rigid drum with internal splines surrounding a flexible cup with external splines. The flexible cup is too small to engage all the splines of the rigid drum, but can be distorted into an elliptical or other shape to engage the rigid drum at two opposite poles along a major axes. A wave generator is rotatably mounted inside the flexible cup to distort it along an axis that can be rotated by the wave generator. If the wave generator rotates relative to the flexible cup, the meshing points orbit within the rigid drum. Since the flexible cup will have fewer splines than the rigid drum, the flexible cup will rotate relative to the rigid drum in the opposite direction as the wave generator, but at speed that can be varied by the wave generator.

In U.S. Pat. No. 5,570,633 a number of printing stations are each provided with an orthogonal gear box. This right angle drive provides an output shaft at right angles to a main shaft. This output is applied through a gear train to an input of a harmonic drive, which is spaced from the orthogonal gear box. The output of the harmonic drive is used to power the associated printing station. This output speed can be adjusted by a stepper motor that rotates another input of the harmonic drive. A disadvantage with this mechanism is the relative complexity of the drive trains and the substantial separation between the orthogonal drive and the harmonic drive. This complexity increases the required number of components, which adversely affects reliability, efficiency, spatial compactness, etc.

For other assemblies using a common shaft to power a number of printing stations see U.S. Pat. Nos. 1,138,782 and 2,115,975. These references do not employ a differential drive for speed adjustment. For a combination of bevel gears interconnected by a common shaft to drive a developing unit and a photoconductive drum, see U.S. Pat. No. 5,319,418. A common shaft driving a number of bevel gears to operate a louver sign is shown in U.S. Pat. Nos. 5,161,421 and 5,511,330. See also U.S. Pat. Nos. 2,916,948; 3,473,410; 4,047,451; 4,090,413; 5,509,866; and 5,634,374.

Accordingly, there is a need for an orthogonal drive with a capability of adjusting its output speed through a mechanism that is relatively compact, reliable, and efficient.

SUMMARY OF THE INVENTION

In accordance with the illustrative embodiments demonstrating features and advantages of the present invention, there is provided an orthogonal differential drive having a main shaft with a main axis. Also included is a primary gear, coaxially mounted on the main shaft, and a secondary gear. The differential drive also has a harmonic drive with a main throughput, a trim throughput, and a harmonic throughput. The harmonic throughput has a speed that is established as a linear combination of speeds of the main throughput and the trim throughput. The secondary gear is coaxially coupled to the main throughput of the harmonic drive. The secondary gear has an axis of rotation positioned transversely to that of the primary gear for engaging the primary gear. Also included is a transfer means spaced from the main axis of the main shaft for interactively engaging the trim throughput of the harmonic drive.

By employing apparatus of the foregoing type, an improved orthogonal drive is achieved. In a preferred embodiment, a main shaft connects to a pair of bevel gears mounted to rotate about perpendicular axes. (In other embodiments different gears may be employed, such as, face gears, hypoid gears, etc.). One of the pair of gears is preferably attached to the rim of the rigid drum of a harmonic drive. This attached gear has a center hole to allow passage of a shaft for the throughput of the wave generator of the harmonic drive. Thus the throughput of the rigid drum and the wave generator is implemented on one side of the harmonic drive, leaving the other side available for the throughput of the flexible cup of the harmonic drive.

In this preferred embodiment, a transfer means connects to the shaft passing through the center hole of the gear on the rigid drum of the harmonic drive. This drive means avoids interference with the axis of the main shaft. Therefore, the main shaft can pass entirely through the assembly and protrude from opposite sides of a housing containing the bevel gears and the harmonic drive.

Preferably, the transfer means for the wave generator of the harmonic drive is another pair of bevel gears that skirt around the main shaft (although other types of drives may be employed, such as spur gears, worm drives etc.)

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1 is a perspective view of an orthogonal differential drive in accordance with principles of the present invention;

FIG. 4 is an axonometric, exploded, schematic illustration of the harmonic drive of FIG. 3;

FIG. 7 is a schematic illustration taken along a plane transverse to the main axis of a drive, which is an alternative to that of FIG. 3.

DETAILED DESCRIPTION OF THE PREFERRED EMBODIMENTS

Figure 2:
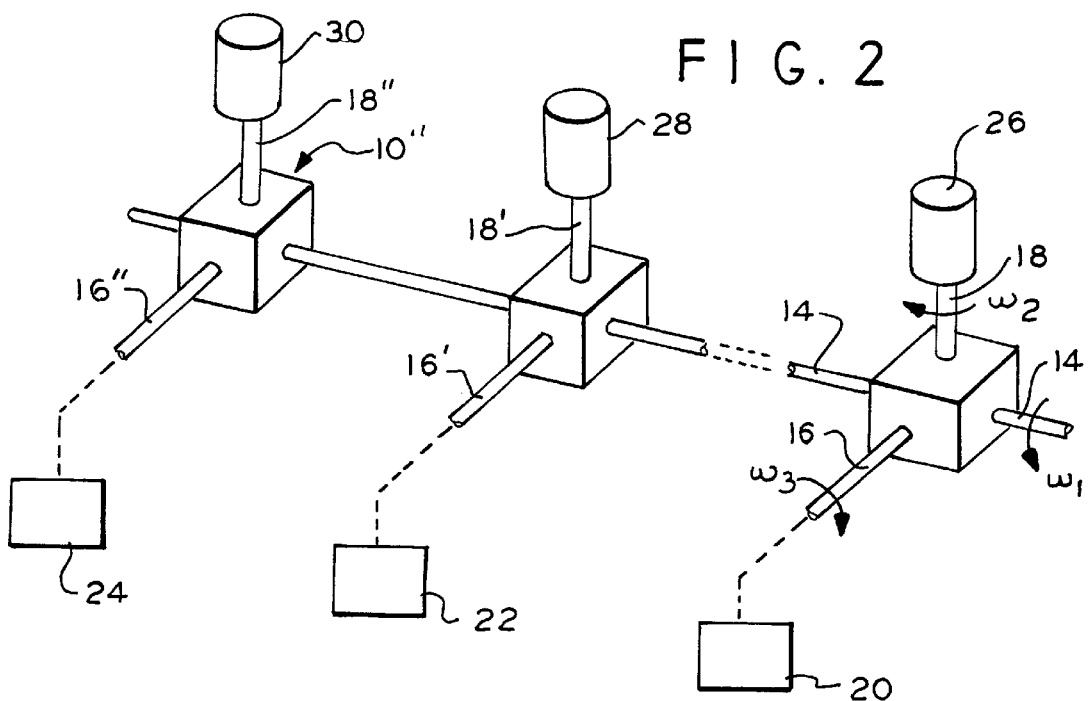
FIG. 2 is an axonometric, schematic illustration of a series of the drives of FIG. 1, combined to power a number of web handling means.

Referring to FIG. 1, an orthogonal differential drive 10 is shown with a drive housing 11 from which main shaft 14 protrudes through opposite sides of the housing. Drive 10 is shown with a perpendicular shaft 16, used as an output shaft in some embodiments. For this drive, shafts 14 and 16 have intersecting axes and therefore lie on the same plane. A trim shaft 18 is shown emerging perpendicularly to the plane of axes 14 and 16. In this embodiment, the axes of shafts 14, 16 and 18 intersect at a point.

FIG. 2 shows previously illustrated drive 10 connected in a system with two other identical drives 10' and 10". Each of the drives are effectively connected coaxially with a single effective main shaft 14 (in practical embodiments the main shaft will be composed of a number of coaxially connected segments). The output shafts 16, 16' and 16" are shown separately connected to a number of web handling means 20, 22 and 24, respectively. Means 20–24 may be a variety of stations for printing various colors, or die cutters, folding machines, stacking machines, etc.

Each of the trim shafts 18, 18', and 18" are shown separately connected to a number of adjustment motors 26, 28 and 30, respectively. Motors 26–30 may be stepper motors or other types of devices for adjusting the output speeds on shafts 16, 16', and 16", as will be described presently.

Figure 3:
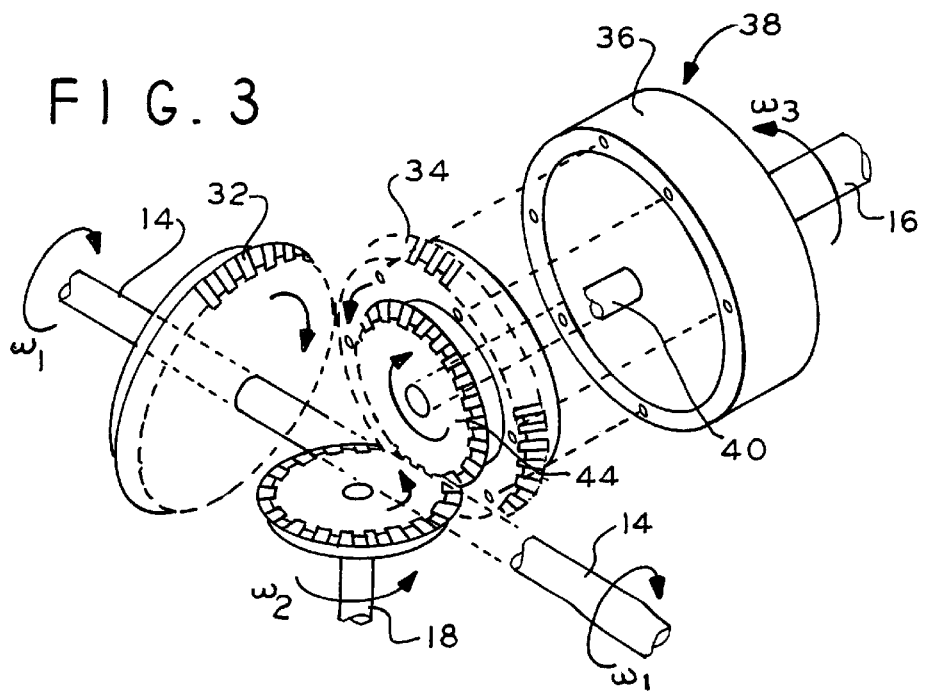
FIG. 3 is an axonometric, exploded, schematic illustration of the mechanism inside the drive of FIG. 1.

Referring to FIG. 3, a pair of gears is shown herein as primary gear 32 and secondary gear 34. (The primary and secondary gears are sometimes referred to as a first and second supplemental gear, respectively). In this embodiment gears 32 and 34 are bevel gears that are mounted to rotate along perpendicular axes. Gear 32 is shown mounted on previously mentioned main shaft 14 (also sometimes referred to as supplemental shaft 14). The main axis of shaft 14 and the axis of rotation of gear 34 will intersect. While bevel gears are illustrated, in some embodiments these gears may be face gears, hypoid gears etc.

A bevel gear is considered herein a gear with peripheral teeth that are arranged on a conical surface centered on the axis of rotation. The axis of rotation of such bevel gears intersect at a point that also lies on a ray common to both conical surfaces, specifically a common ray that projects from the region where the gears mesh. A face gear can be similar to a bevel gear with teeth arranged on conical surfaces, but with the interface where the teeth mesh defining a common conical ray that does not intersect at the intersection of the axes of rotation. In some cases, a face gear set will have on one gear, radial teeth lying on a plane transverse to the axis of rotation. Then a mating gear mounted at right angles can mesh with the radial teeth of the face gear.

Bevel gear 34 is shown with a number of circumferentially spaced mounting holes for attachment to the rim of a rigid drum 36 of harmonic drive 38. Harmonic drive 38 is shown with a shaft 40 for rotating a wave generator that will be described further hereinafter. Drive 38 is also shown with a shaft 16 connecting to a flexible cup (also referred to as a flexible annular member) that will be further described presently. For now, harmonic drive 38 will be considered to have three angular degrees of freedom about: shaft 40, shaft 16, and drum 36. Shaft 40 and shaft 16 are referred to as a trim throughput and harmonic throughput, respectively. Also, the rotatable drum 36 is referred to as a main throughput. (In some cases, the harmonic drive is referred to as a supplemental harmonic driver.)

A driving means (also referred to as a transfer means) is shown herein as a trim wheel 44 and a drive wheel 46. Drive wheel 46 is shown attached to shaft 18. In this embodiment, wheels 44 and 46 are shown as transverse bevel gears, but may in other embodiments include face gears, hypoid gears, etc. Wheel 44 is mounted on shaft 40 which passes through a center hole in bevel gear 34, so that gear 34 and wheel 44 can rotate coaxially and independently. Arranged in this fashion, the wheels 44 and 46 skirt the main axis of main shaft 14. Therefore, main shaft 14 can pass unobstructed through the mechanism in order to protrude from opposite sides of the drive housing as shown previously (e.g., FIG. 1). In this arrangement, the axes of shaft shafts 14, 16, 40 and 18 intersect at a single point.

While bevel gears are shown, in some embodiments gear 46 can be eliminated and gear 44 can be an ordinary gear driven by a spur gear or a worm. In any case, it is desirable to keep such mechanism for driving shaft 40 away from the main axis of main shaft 14.

Referring to FIG. 4, previously illustrated harmonic drive 38 is shown comprising an annular, rigid drum 36 surrounding a flexible cup 50 containing a wave generator 52. The wave generator 52 has an elliptical outline defining a major axis 54. Generator 52 is rotated by previously mentioned shaft 40. Generator 52 fits inside flexible cup 50 to distend it along the major axis 54. Therefore the external splines 51 of cup 50 can engage the internal splines 37 of drum 36 at the opposite poles created by the major axis 54.

If $\omega_3$ is the angular speed of cup 50, $a\omega_1$ the angular speed of drum 36, and $b\omega_2$ the angular speed of wave generator 52, then:

$$\omega_3 = (n_1/n_2)a\omega_1 - 2(b\omega_2/n_2) \tag{1}$$

where $n_1$ and $n_2$ are the number of splines 37 and 51, respectively. The coefficient a designates the gear ratio of bevel gears 32 and 34, while coefficient b corresponds to the gear ratio of gears 44 and 46 (FIG. 3).

Figure 5:
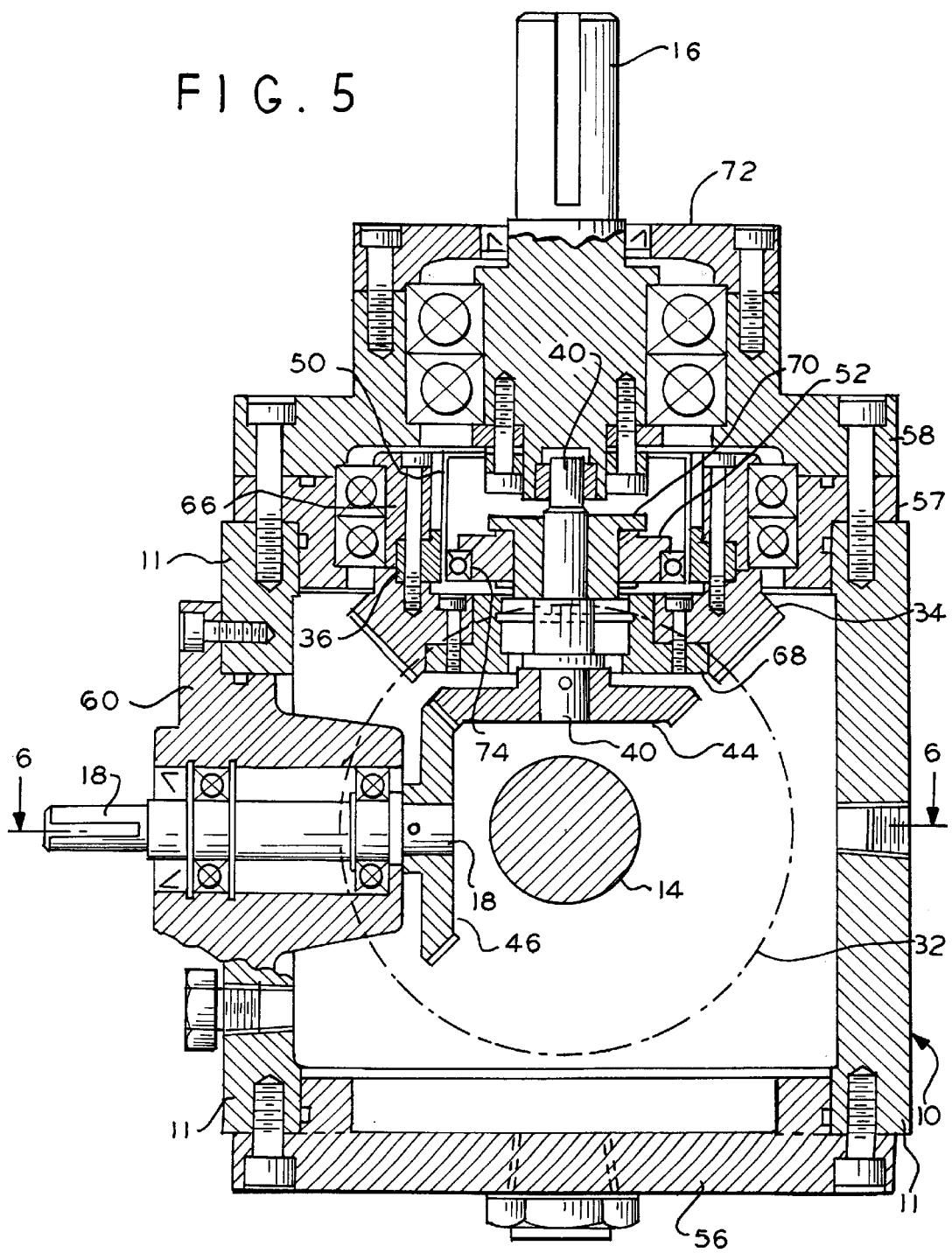
FIG. 5 is a detailed, sectional view of the harmonic drive of FIGS. 3 and 4 through a central plane that is transverse to the main shaft.
Figure 6:
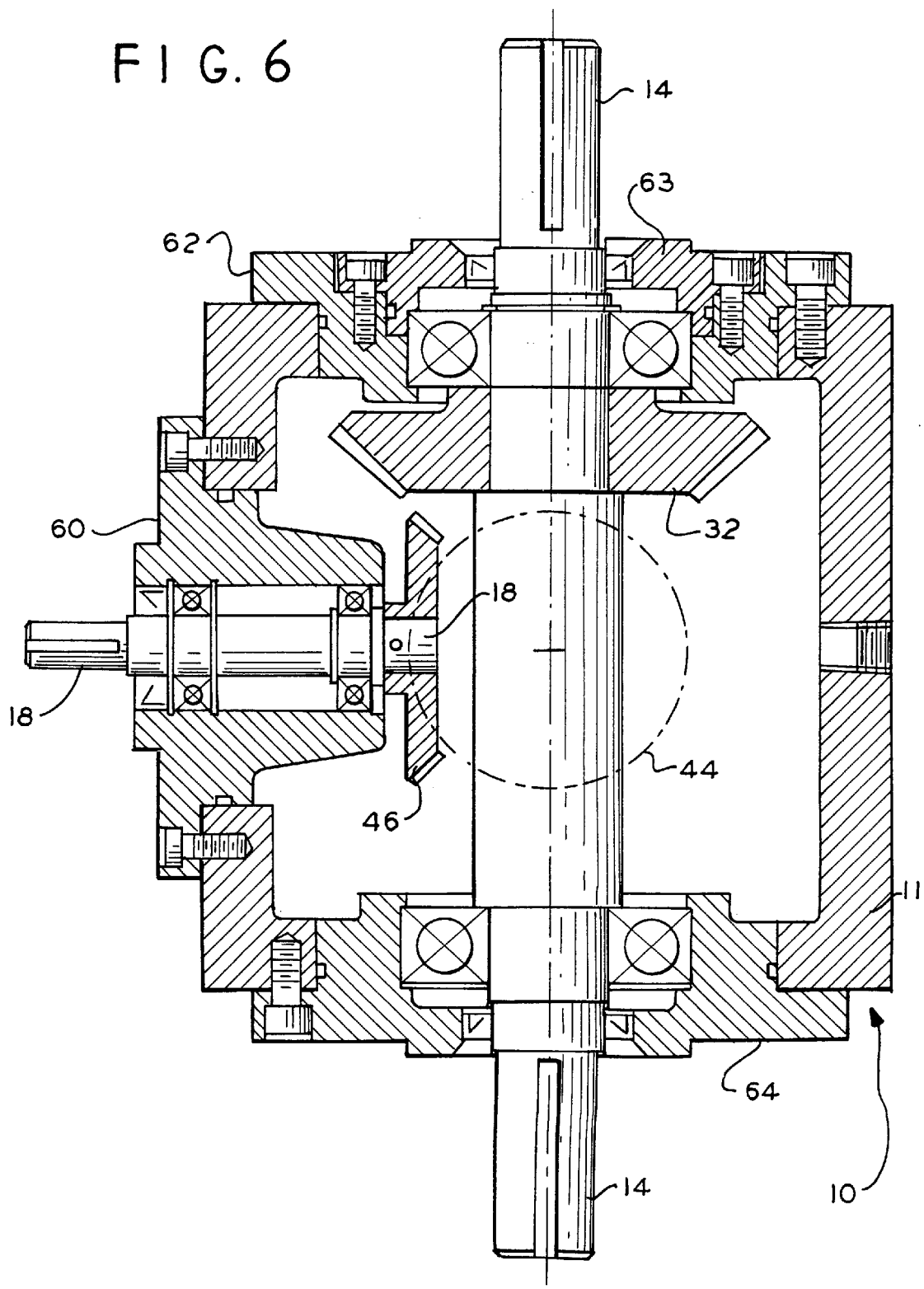
FIG. 6 is a cross sectional view, taken along line 6—6 of FIG. 5.

Referring to FIGS. 5 and 6, drive 10 is contained in a six-sided housing 11 that is cast or is fabricated from plates that are welded together. Housing 11 has openings on five sides, one being closed by cover plate 56, another by journal plates 58/57, and still another by journal plate 60 (FIG. 5). Journal plate 60 rotatably supports previously mentioned trim shaft 18, which supports the bevel gear 46. Shaft 16 is rotatably mounted in journal plate 58, with journal plate 57 sandwiched between journal plate 58 and housing 11. Journal plate 58 is covered by cap 72.

A pair of journal plates 62 and 64 (FIG. 6) are mounted on opposite faces of housing 11 to rotatably support main shaft 14. Journal plate 62 is covered by a cap 63. Shaft 14 supports primary gear 32, which engages the secondary gear 34.

Secondary gear 34 is shown bolted onto previously mentioned drum 36 (FIG. 5). Specifically, drum 36 is sandwiched between secondary gear 34 and support annulus 66, which are all bolted together. Plate 57 acts as a bearing for rotatably supporting the assembly comprising annulus 66, drum 36, and secondary gear 34.

A guide 68 is bolted to the inside face of secondary gear 34 to rotatably support previously mentioned shaft 40, which in turn supports trim wheel 44. Trim wheel 44 is shown as a bevel gear engaging the drive wheel 46, which is mounted on trim shaft 18.

Shaft 40 is affixed to collar 70, which in turn is affixed to the wave generator 52. Collar 70 and generator 52 rotate together with shaft 40 and trim wheel 44. The distal end of shaft 40 is rotatably supported in a recess in the inside end of previously mentioned shaft 16.

The inner end of shaft 16 is bolted to previously mentioned flexible cup 50, which is shaped as a bowl with an open bottom. The actual interface between generator 52 and cup 50 is effected by a bearing assembly 74 having a pair of flexible, opposing races entrapping a number of balls, in a conventional manner.

Referring to FIG. 7, an alternate transfer means is shown for driving the previously mentioned shaft 40. Components in this Figure that are identical to previously mentioned components, bear the same reference numerals. In this embodiment the shaft 40 supports a gear 44A. Gear 44A is driven by a spur gear 76 that is supported on shaft 78. As before, the combination of gears 44A and 76 skirt around main shaft 14, so it can pass through the mechanism and emerge on opposite sides of the housing.

While a spur gear 76 is shown, in other embodiments that gear can be replaced by a worm drive that peripherally engages gear 44A, and still avoids interference with main shaft 14. In either of these two latter instances, the externally extending shaft for driving internal shaft 40 is not coplanar with either shaft 14 or 16. However, the specific orientation of the external shaft driving internal shaft 40 is less important than the orientation for shafts 14 and 16, which typically provide a main power transfer.

To facilitate an understanding of the principles associated with the foregoing apparatus, its operation will be briefly described. In operation, the orthogonal drives may be arranged as shown in FIG. 2. Then a single power source can drive shaft 14, thereby providing power to each of the drives 10, 10', and 10". In such arrangements, the separate adjustment motors 26, 28, and 30 can change the output speed on shafts 16, 16', and 16". As mentioned before, these different speeds can compensate for stretching of a web during successive handling by handling means 20, 22, and 24. Alternatively, temporary speed changes may be necessary to bring the various stations into registration.

Each of the above drives operate similarly and the operation of one will be given in order to characterize the operation of the others. Assuming for now that the associated adjusting motor is still, the angular speed $\omega_2$ (FIG. 3) will be zero. Therefore, shaft 40 will be stationary, since gears 44 and 46 do not turn. Main shaft 14, however, rotates at angular speed $\omega_1$. This causes gear 34 and drum 36 to rotate at an angular speed of $a\omega_1$, where a represents the gear ratio of gears 32 and 34.

Referring to FIG. 4, wave generator 52 remains stationary while drum 36 rotates. This causes cup 50 to rotate in the same direction, but at a slightly different speed. The splines of drum 36 and cup 50 that currently mesh are located along the major axis 54, but the splines continually move past that distended position. Accordingly, progressive intervals of the splines 37 and 51 will successively mesh. Since cup 50 has fewer splines, after drum 36 makes one revolution, it will have enmeshed more splines than exist on the periphery of drum 50. Therefore, cup 50 will rotate further than drum 36 by an amount equal to the difference in the splines. Thus the output speed $\omega_3$ will be close to the input speed $a\omega_1$, but slightly greater.

Because of this speed difference between drum 36 and cup 50, the gears 32 and 34 (FIG. 3) may compensate with a ratio different than one to one. With compensation, the speed on shafts 14 and 16 can be identical if shaft 18 is stationary. Of course, some embodiments may contemplate a speed increase or reduction between shafts 14 and 16, in which case gears 32 and before will be significantly different in diameter. Nevertheless, it may be desirable to maintain an integer ratio for the speeds of shafts 14 and 16, when trim shaft 18 is stationary. Again, the gear ratios between gears 32 and 34 can be made slightly different from the target integer ratio to compensate for the speed difference caused by the harmonic drive 38. Of course, compensation may be unimportant in other embodiments, in which case gears 32 and 34 need not have special compensating ratios.

For illustrative purposes, one can assume the drum 36 remains stationary while wave generator 52 rotates. In this case, an identical form of meshing will occur, wherein the cup 50 will engage the splines 37 of drum 36 at progressive angular positions as the generator 52 rotates. Because splines 51 are fewer in number than splines 37, cup 50 must retreat after one revolution of generator 52. This means cup 50 rotates in a direction opposite to that of generator 52. This retreating rotation is equal to the difference in the splines.

One can change the inertial reference to describe rotation of the entire assembly. Nevertheless, the angular speed of the generator 52 relative to drum 36 will still define the differential speed of cup 50 relative to drum 36. When drum 36 is rotating, this differential speed will be subtracted (or added) from the speed of drum 36 to give the relative speed of the cup (relative to the drum).

Accordingly, the output speed $\omega_3$ will be close to the angular speed $a\omega_1$ caused by the main shaft, but adjusted by the speed of the trim shaft 18, in accordance with the above noted relationships.

The operation of systems employing drives according to FIG. 7 will be substantially the same, after taking into account the differing gear ratios for the trim shaft inputs.

While the foregoing assumed main shaft 14 was a driving shaft and shaft 16 was driven, in different environments, these roles can be reversed. Other environments are possible where the trim shaft 18 may function as an output shaft when shafts 14 and 16 are inputs. In fact, the role of each shaft may change over time in some environments, between the role of input and output.

It is appreciated that various modifications may be implemented with respect to the above described, preferred embodiment. For example, the various illustrated gears can have spirally cut teeth or teeth cut in alternate fashions. While a simple rectangular housing is illustrated, in other embodiments a more complex or a curved housing is possible. Furthermore, the relative spacing and position of the various components can be altered depending upon the desired strength, compactness, structural integrity, etc. The dimensions and proportions of the various components can be altered depending upon the desired strength, and depending upon whether a speed increase or reduction is desired. While some shafts are shown as a solid component, in other embodiments they may be composite bodies formed of coaxially interconnected segments. Also, the illustrated drive may be used in environments other than those of the printing industries.

Obviously, many modifications and variations of the present invention are possible in light of the above teachings. It is therefore to be understood that within the scope of the appended claims, the invention may be practiced otherwise than as specifically described.

I claim:

1. An orthogonal differential drive, comprising:

a main shaft having a main axis;

a primary gear coaxially mounted on said main shaft;

a harmonic drive having a main throughput, a trim throughput, and a harmonic throughput, said harmonic throughput having a speed that is established as a linear combination of speeds of said main throughput and said trim throughput;

a secondary gear coaxially coupled to said main throughput of said harmonic drive and having an axis of rotation positioned transversely to that of said primary gear for engaging said primary gear;

a transfer means spaced from said main axis of said main shaft for interactively engaging said trim throughput of said harmonic drive.

2. An orthogonal differential drive according to claim 1 comprising:

a housing containing said harmonic drive, and said primary and said secondary gear, said main shaft protruding from opposite sides of said housing.

3. An orthogonal differential drive according to claim 1 wherein the axis of rotation of said secondary gear perpendicularly intersects the main axis of said main shaft.

4. An orthogonal differential drive according to claim 1 wherein the harmonic throughput of said harmonic drive has an axis of rotation that perpendicularly intersects the main axis of said main shaft.

5. An orthogonal differential drive according to claim 1 wherein said harmonic drive comprises:

a drum with a plurality of rigid internal splines;

a flexible annular member mounted inside said drum with a plurality of external splines for at least partially engaging the internal splines of said drum; and a generator rotatably mounted inside said flexible annular member for distending said flexible annular member along a major axis, said major axis rotating with said generator.

6. An orthogonal differential drive according to claim 5 wherein said generator is coupled to and driven by said transfer means.

7. An orthogonal differential drive according to claim 5 wherein said drum is coaxially attached to and driven by said secondary gear.

8. An orthogonal differential drive according to claim 7 wherein said secondary gear has a center hole, said transfer means being coupled to said generator through said center hole of said secondary gear.

9. An orthogonal differential drive according to claim 5 wherein said transfer means comprises:

a trim wheel coaxially attached to said generator.

10. An orthogonal differential drive according to claim 9 wherein said transfer means comprises:

a drive wheel meshing with said trim wheel, said drive wheel and said trim wheel having perpendicular axes of rotation.

11. An orthogonal differential drive according to claim 10 wherein said drive wheel and said trim wheel have axes of rotation that intersect said main axis of said main shaft.

12. An orthogonal differential drive according to claim 10 wherein said drive wheel and said trim wheel are bevel gears having axes of rotation that intersect said main axis of said main shaft.

13. An orthogonal differential drive according to claim 9 wherein said transfer means comprises:

a spur gear meshing with said trim wheel, said spur gear and said trim wheel having parallel axes of rotation.

14. An orthogonal differential drive according to claim 9 wherein said transfer means comprises:

a worm peripherally engaging said trim wheel.

15. An orthogonal differential drive according to claim 1 wherein said secondary gear has a center hole, said transfer means being coupled to said trim throughput through said center hole of said secondary gear.

16. An orthogonal differential drive according to claim 15, comprising:

a housing containing said harmonic drive, and said primary and said secondary gear, said main shaft protruding from opposite sides of said housing, the axis of rotation of said secondary gear perpendicularly intersecting the main axis of said main shaft.

17. An orthogonal differential drive according to claim 16 wherein said primary and said secondary gears a re bevel gears.

18. An orthogonal differential drive according to claim 1 wherein said primary and said secondary gears are bevel gears.

19. An orthogonal differential drive according to claim 1 wherein said primary and said secondary gears are face gears.

20. An orthogonal differential drive according to claim 1 wherein said primary and said secondary gears are hypoid gears.

21. An orthogonal differential drive according to claim 1 wherein said harmonic drive has a non-unitary gearing ratio from said main throughput to said harmonic throughput, said primary and said secondary gears having a gear ratio for producing a net transmission ratio from said primary gear to said harmonic throughput that is an integer ratio.

22. An orthogonal differential drive according to claim 1, comprising:

a supplemental shaft coupled coaxially to said main shaft along said main axis;

a first supplemental gear coaxially mounted on said supplemental shaft;

a supplemental harmonic driver having a main throughput, a trim throughput, and a harmonic throughput, said harmonic throughput having a speed that is produced as a linear combination of the speed of said main throughput and said trim throughput;

a second supplemental gear coaxially coupled to said main throughput of said supplemental harmonic driver and having an axis of rotation positioned transversely to that of said first supplemental gear for engaging and being driven by said first supplemental gear;

a driving means spaced from said main axis of said supplemental shaft for driving said trim throughput of said supplemental harmonic driver.

23. An orthogonal differential drive according to claim 22, comprising:

a first web handling means coupled to and driven by said harmonic throughput of said harmonic drive; and a second web handling means coupled to and driven by said harmonic throughput of said supplemental harmonic driver.

* * * * *